United States Patent
Kalamkar et al.

(10) Patent No.: US 11,550,692 B2
(45) Date of Patent: Jan. 10, 2023

(54) INTEGRATED EVENT PROCESSING AND POLICY ENFORCEMENT

(71) Applicant: Intuit Inc., Mountain View, CA (US)

(72) Inventors: Amit Shriram Kalamkar, Fremont, CA (US); Edward Kihyen Lee, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 491 days.

(21) Appl. No.: 16/699,404

(22) Filed: Nov. 29, 2019

(65) Prior Publication Data

US 2021/0165725 A1   Jun. 3, 2021

(51) Int. Cl.
| | |
|---|---|
| *G06F 11/34* | (2006.01) |
| *G06F 9/54* | (2006.01) |
| *G06K 9/62* | (2022.01) |
| *G06N 20/00* | (2019.01) |
| *G06F 21/55* | (2013.01) |

(52) U.S. Cl.
CPC .......... *G06F 11/3452* (2013.01); *G06F 9/542* (2013.01); *G06F 11/3447* (2013.01); *G06F 21/554* (2013.01); *G06K 9/6288* (2013.01); *G06N 20/00* (2019.01)

(58) Field of Classification Search
CPC .. G06F 11/3452; G06F 9/542; G06F 11/3447; G06F 21/554; G06F 2201/86; G06K 9/6288; G06K 9/6224; G06K 9/6284; G06N 20/00; G06N 5/003; G06V 2201/10
USPC .......................................................... 726/1
See application file for complete search history.

(56) References Cited

U.S. PATENT DOCUMENTS

| | | | | |
|---|---|---|---|---|
| 10,467,526 | B1* | 11/2019 | Appalaraju | G06V 10/82 |
| 2018/0300653 | A1* | 10/2018 | Srinivasan | H04L 67/322 |
| 2019/0050680 | A1* | 2/2019 | Waugh | G06F 9/455 |
| 2019/0253319 | A1* | 8/2019 | Kampanakis | H04L 41/0816 |

\* cited by examiner

*Primary Examiner* — Kambiz Zand
*Assistant Examiner* — Aubrey H Wyszynski
(74) *Attorney, Agent, or Firm* — Ferguson Braswell Fraser Kubasta PC

(57) ABSTRACT

A method may include receiving an event from an event source. The event may correspond to event data. The event source may be a container executing an image. The image may correspond to image metadata including attributes describing the image. The method may further include combining the event data with the image metadata to obtain enriched data, detecting, using the enriched data, a deviation from a policy, and in response to detecting the deviation from the policy, performing an action to enforce the policy.

20 Claims, 9 Drawing Sheets

INTEGRATED EVENT PROCESSING AND POLICY ENFORCEMENT

BACKGROUND

Ensuring coherent behavior in a distributed system including multiple computing nodes can be challenging. For example, an organization may seek to enforce policies (e.g., security and/or resource utilization policies) across clusters of computing nodes in a distributed system. The policies may apply to computing nodes individually and/or as a group. It is desirable to provide a capability for timely detection of deviations from policies and timely responses to such policy deviations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including receiving an event from an event source. The event corresponds to event data. The event source is a container executing an image. The image corresponds to image metadata including attributes describing the image. The method further includes combining the event data with the image metadata to obtain enriched data, detecting, using the enriched data, a deviation from a policy, and in response to detecting the deviation from the policy, performing an action to enforce the policy.

In general, in one aspect, one or more embodiments relate to a system including event sources including an event source that is a container executing an image. The image corresponds to image metadata including attributes describing the image. The system further includes a repository storing events including an event corresponding to event data. The system further includes a policy enforcer configured to receive the event from the event source, combine the event data with the image metadata to obtain enriched data, detect, using the enriched data, a deviation from a policy, and in response to detecting the deviation from the policy, perform an action to enforce the policy.

In general, in one aspect, one or more embodiments relate to a method including receiving an event from a container executing an image. The image corresponds to image metadata including attributes describing the image. The method further includes combining the event with the image metadata to obtain enriched data, detecting, using the enriched data, a deviation from a security policy, and in response to detecting the deviation from the security policy, performing an action to enforce the security policy.

Other aspects of the invention will be apparent from the following description and the appended claims.

DETAILED DESCRIPTION

Figure 1A:
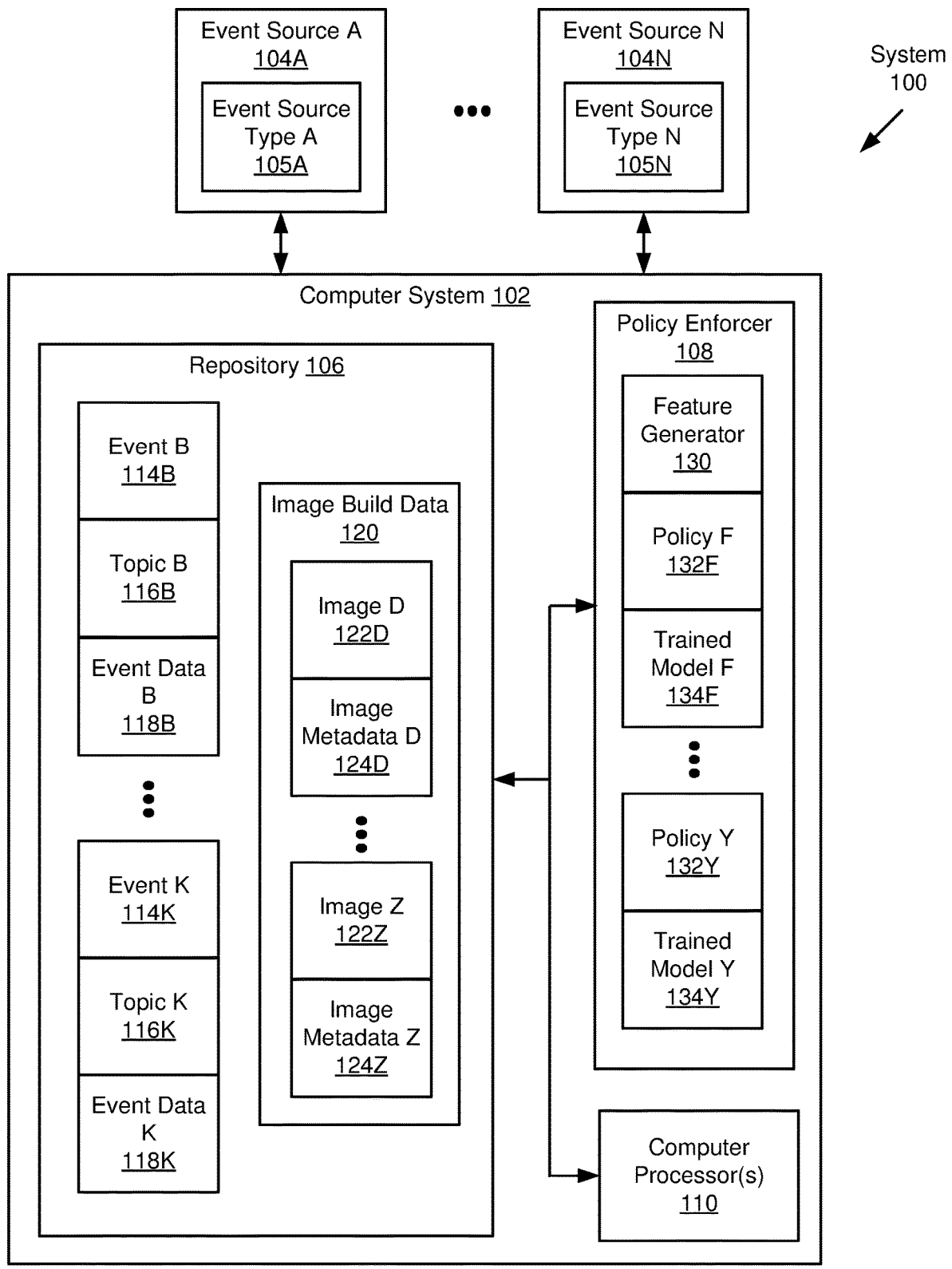
FIG. 1A, FIG. 1B, and FIG. 1C show flow diagrams of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to enforcing policies by analyzing events. In one or more embodiments, an event is received from an event source having an event source type. The event source may be a container executing an image, where the image is described by image metadata. Alternatively, the event may be received from a different event source type, such as a cluster, a gateway, etc. Event data describing the event may be combined with the image metadata to obtain enriched data that includes linkages between the event data and the image metadata. For example, the enriched data may link the event data and an owner of the image executed by the container that generated the event. A deviation from a policy may be detected using the enriched data. For example, the policy may be a security policy for an enterprise-wide computing platform or a load balancing policy for a cluster. The deviation from the policy may be detected (e.g., predicted) by applying a trained model to features extracted from events. The trained model may learn correlations between the extracted features and policy deviations.

In response to detecting the deviation from the policy, an action may be performed to enforce the policy. A "soft" action may send a notification regarding the deviation to an owner of the image executed by the container that generated the event. For example, the notification may be sent via an email message or via a dashboard alert. Alternatively, a "hard" action may modify the execution of the container that generated the event. For example, the execution of the container may be halted, or a diagnostic scan of the container may be initiated. A proactively performed action may prevent an actual policy deviation (e.g., a security violation or a resource utilization imbalance) from occurring.

FIG. 1A shows a system (100) in accordance with one or more embodiments of the invention. As shown in FIG. 1A, the system (100) includes a computer system (102) and event sources (104A, 104N). The computer system (102) may correspond to the computing system (500) described with respect to FIG. 5A and the accompanying description below, or take the form of the client device (526) described with respect to FIG. 5B. In one or more embodiments, the computer system (102) and the event sources (104A, 104N) may communicate via a computer network (not shown) (e.g., the network (520) described with respect to FIG. 5B).

In one or more embodiments, an event source (104A) includes one or more computing nodes. Each computing node may correspond to the computing system (500) described with respect to FIG. 5A and the accompanying description below, or take the form of the client device (526) described with respect to FIG. 5B. Event sources (104A, 104N) may have event source types (105A, 105N). For example, turning to FIG. 1B, an event source type (150) may be one of the following: a container (152) executing on a computing node, a cluster (154) of computing nodes, a gateway (156), a platform (158) (e.g., a Kubernetes® platform), etc. A container (152) executes an image (155). The container (152) may be considered to be an instance of the image (155). An image (155) may include executable code and an execution environment. In one or more embodiments, the executable code may be a collection of object code (e.g., generated by a compiler). For example, the executable code may be a dynamically linked code or an archive file that packages compiled components. In one or more embodiments, the execution environment includes software components needed to execute the executable code. For example, the execution environment may include libraries, frameworks, configuration files, and any other software components or technologies upon which the executable code depends (e.g., no additional installation, customization, or resources are required to execute the executable code).

Returning to FIG. 1A, in one or more embodiments, an event source (104A) generates events (e.g., 114B, 114K). In one or more embodiments, an event (114B) is a description of the runtime activity of the event source (104A). The event source (104A) may include functionality to transmit messages describing events (114B, 114K) to the computer system (102) over a network (e.g., network (520) of FIG. 5B). Examples of events may include: deployment of a container executing an image, utilization of central processing unit (CPU) cores by a container or a computing node, utilization of memory by a container or a computing node, receiving a message at a gateway, etc.

As shown in FIG. 1A, the computer system (102) includes a repository (106), a policy enforcer (108), and one or more computer processors (110). In one or more embodiments, the computer processor(s) (110) takes the form of the computer processor(s) (502) described with respect to FIG. 5A and the accompanying description below. In one or more embodiments, the computer processor (110) includes functionality to execute the policy enforcer (108).

In one or more embodiments, the repository (106) may be any type of storage unit and/or device (e.g., a file system, database, collection of tables, or any other storage mechanism) for storing data. Further, the repository (106) may include multiple different storage units and/or devices. The multiple different storage units and/or devices may or may not be of the same type or located at the same physical site.

In one or more embodiments, the repository (106) includes events (114B, 114K) and image build data (120). Events (114B, 114K) may correspond to topics (116B, 116K) and event data (118B, 118K). The topic (116B) corresponding to an event (114B) may be a keyword or phrase describing the event (114B). In one or more embodiments, multiple topics may be associated with an event (114B). An event (114B) may be described by a message.

For example, the message may be generated by a computing node (e.g., a cluster, gateway, etc.) associated with the event (114B). Continuing this example, the message may identify a container (152) and/or an image (155) associated with the event (114B). The event data (118B) corresponding to an event (114B) may include attributes of the event (114B). Examples of event data (118B) include: an identifier of the corresponding event (114B), an owner of an event source (104A) that generated the event (114B), an event type (e.g., deployment event, scheduled event, recurring event, error event, etc.), results of a runtime scan performed at the event source (104A) that generated the event (114B), etc. In one or more embodiments, the event data (118B) is specific to the event source type (105A) of the event source (104A) that generated the event (114B). For example, event data (118B) may include attributes of the container (152), cluster (154), gateway (156), or platform (158) that generated the event (114B).

In one or more embodiments, the image build data (120) includes image metadata (124D, 124Z) corresponding to images (122D, 122Z). The image metadata (124D) includes attributes of the corresponding image (122D). Examples of image metadata (124D) include: an identifier of the corresponding image (122D), an owner of the corresponding image (122D), a security level of the corresponding image (122D), a lineage of the corresponding image (122D), a certification of the corresponding image (122D), etc. For example, the security level (e.g., gold, silver, bronze) may indicate the level of compliance of the image (122D) with a set of deployment requirements. Continuing this example, the security level may be based on the results of a security scan (e.g., performed by a TWISTLOCK® service, operating system specific security tests, or other tools for scanning containers or debugging software). The lineage may be a history of how and/or when the image (122D) was created. For example, the lineage may include a release version, time of build, time of publication, time of version release, and any other relevant information. The owner may be a point of contact responsible for the corresponding image (122D). For example, the owner may be represented as an email address for an individual or group.

In one or more embodiments, the policy enforcer (108) may be implemented in hardware (e.g., circuitry), software, firmware, and/or any combination thereof. In one or more embodiments, the policy enforcer (108) includes a feature generator (130), policies (132F, 132Y), and trained models (134F, 134Y). The feature generator (130) may include functionality to generate features (e.g., 162A, 162B, 162E, 162K, 162Z of FIG. 1C) from event data (118B, 118K) and/or image metadata (124D). In one or more embodiments, features (162A, 162B, 162E, 162K, 162Z) are attributes extracted from events (114B, 114K). A feature (162A) may represent an aggregation or summary of event data (118B, 118K) associated with events (114B, 114K). For example, a feature (162A) may be a count of events (114B, 114K) of a specific type. Continuing this example, the type of event may be the deployment of a container or the measurement of a resource level (e.g., CPU or memory utilization level). As another example, a feature (162A) may be a count of events (114B, 114K) occurring within a specific time interval (e.g., a count of network connection messages or error messages received by a gateway within a time interval). Other examples of features (162A, 162B, 162E, 162K, 162Z) may include: an average value of event data (118B, 118K) (e.g., CPU utilization, message latency) associated with events (114B, 114K) of a specific type, or a statistical measurement of event data (118B, 118K) associated with events (114B, 114K) of a specific type. Alternatively, a feature (162A) may represents any distinguishing characteristic associated with events (114B, 114K). A feature (e.g., 162A) may be aggregated at varying levels of detail. For example, a feature (162A) may be aggregated for a specific event source type (105A). Continuing this example, a feature (162A) may describe events (114B, 114K) generated by a container (152), a cluster (154), a gateway (156), etc. Furthermore, a feature (162A) may be associated with image metadata (124D). For example, the image metadata (124D) may correspond to an image (155) executed by a container (152) that generated an event (114B).

In one or more embodiments, the feature generator (130) includes functionality to generate features (162A, 162B, 162E, 162K, 162Z) based on event data (118B, 118K). The feature generator (130) may include functionality to store features (162A, 162B, 162E, 162K, 162Z) in the repository (106).

In one or more embodiments, a policy (132F) is a rule applied to events (114B, 114N). In one or more embodiments, a policy (132F) is specific to an event source type (105A). For example, a policy (132F) may apply to containers (152) clusters (154) and/or gateways (156). The rule may indicate conditions when events (114B, 114N) deviate from the policy (132F). In one or more embodiments, the rule is based on features (162A, 162B, 162E, 162K, 162Z) generated from the events (114B, 114N). In one or more embodiments, a policy (132F) corresponds to a trained model (134F). For example, the rule may be based on a score generated by the corresponding trained model (134F) based on values of the features (162A, 162B, 162E, 162K, 162Z). Continuing this example, the rule may indicate a range of scores that correspond to a deviation from the policy (132F). Further continuing this example, the rule may indicate a threshold score above which the policy (132F) is considered to be violated.

The rule may be generated based on applying the trained model (134F) corresponding to the policy (132F) to training data. For example, the training data may include sets of events (114B, 114N) labeled as "policy deviation" or "no policy deviation". Continuing this example, the relative importance (e.g., weighting) of features (162A, 162B, 162E, 162K, 162Z) in the trained model (134F) corresponding to the policy (132F) may be learned, in part, based on the training data. The relevance of a specific feature may vary across trained models, since the relevance of the specific feature depends on the policy (132F) corresponding to the trained model (134F).

Figure 1B:
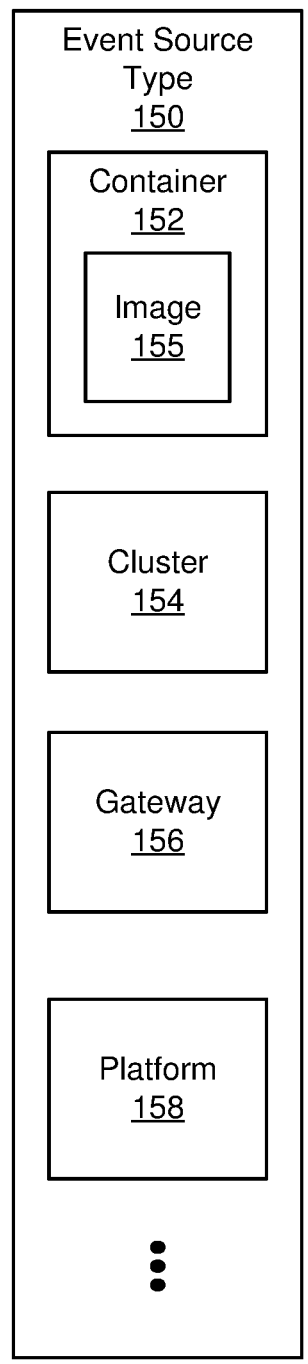
Figure 1C:
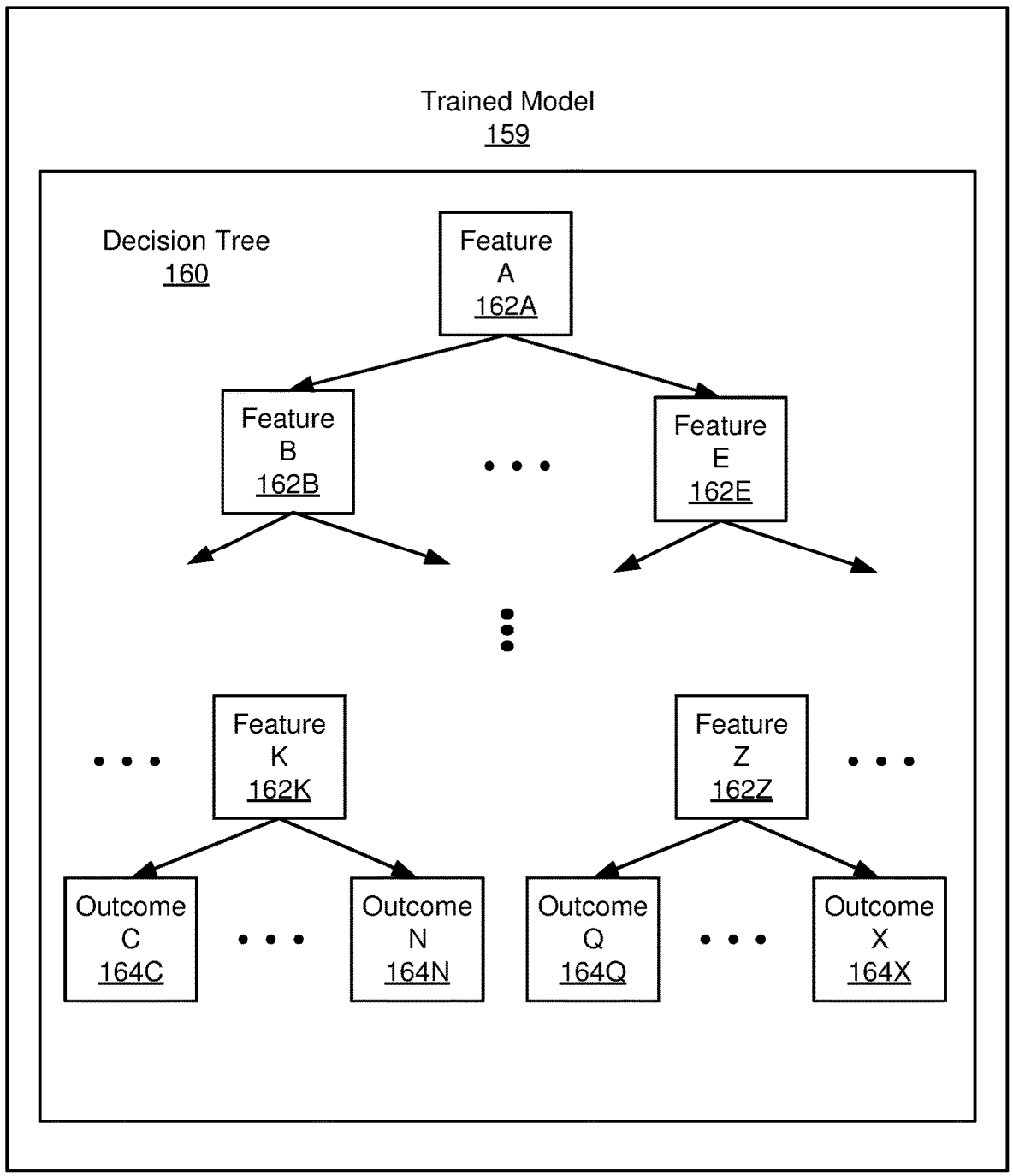

Turning to FIG. 1C, in one or more embodiments, a trained model (159) is a decision tree (160) whose internal nodes correspond to features (e.g., 162A, 162B, 162E, 162K, 162Z). For example, the decision tree (160) may be a Shannon entropy decision tree. In one or more embodiments, the trained model (126) includes functionality to predict an outcome (e.g., 164C, 164N, 164Q, 164X) based on events (114B, 114K). The outcome may be whether or not the events (114B, 114K) correspond to a deviation from a policy (132F) corresponding to the trained model (159). The trained model (159) may learn the correlation of features (e.g., 162A, 162B, 162E, 162K, 162Z) to outcomes (e.g., 164C, 164N, 164Q, 164X) based on a supervised training data set. In one or more embodiments, each element of the training data set is a vector of feature values labeled with an outcome. The branches (e.g., edges) of the decision tree (160) may represent values of the features. The feature vector may be weighted according to the information theory definition of entropy of the feature values. The information theory definition of entropy for a multiclass input is $E = -\Sigma_{i=1}^{n} p_i \log_2 p_i$, where n is the number of classes of information, $p_i$ is the probability of an object from the $i^{th}$ class appearing, $\Sigma$ is a summation mathematical operator, and $\log_2$ is a logarithmic mathematical operator.

In one or more embodiments, a leaf node of the decision tree (160) represents a possible outcome (e.g., 164C, 164N, 164Q, 164X) of events (114B, 114K) based on a path through the decision tree (160) to the leaf node. A leaf node of the decision tree (160) may also represent a probability associated with the outcome. In one or more embodiments, a path through the decision tree (160) includes a series of branches terminating at a leaf node. The series of branches may correspond to the values of a feature vector, where the feature vector assigns a value to each of a set of features. Each path may classify the feature values corresponding to the branches on the path as a prediction regarding whether events (114B, 114K) deviate from a policy with a corresponding probability. For example, an outcome (164C) may be a probability that a deviation from a policy (132F) corresponding to the trained model (134F) has occurred. In one or more embodiments, the probability associated with a leaf node is the ratio of the deviation outcomes divided by the total number of outcomes in the training data set at the branch of the decision tree (160) terminating at the leaf node. For example, one leaf node may represent an outcome indicating a policy deviation with a probability of 0.3. Another leaf node may represent an outcome indicating a policy deviation with a probability of 0.7. The trained model (159) may learn the probabilities associated with policy deviations based on supervised training data.

In one or more embodiments, the trained model (159) includes functionality to detect an anomaly in the values of a feature (e.g., 162A). For example, the anomaly may be a "spike" in the value of the feature (162A). Continuing this example, the spike may be detected when a value of the feature (162A) exceeds the mean value of the feature (162A) by two standard deviations or some other statistical measure. The trained model (134F) may learn (e.g., based on training data) the correlation between the anomaly and the deviation from the policy.

In one or more embodiments, the policy enforcer (108) includes functionality to receive events (114B, 114K) from event sources (104A, 104N). The policy enforcer (108) may include functionality to combine event data (118B, 118K) with image metadata (124D, 124Z). The policy enforcer (108) may include functionality to detect a deviation from a policy (132F, 132Y). The policy enforcer (108) may include functionality to perform an action to enforce a policy (132F, 132Y).

While FIG. 1A, FIG. 1B, and FIG. 1C show configurations of components, other configurations may be used without departing from the scope of the invention. For example, various components may be combined to create a single component. As another example, the functionality performed by a single component may be performed by two or more components.

Figure 2A:
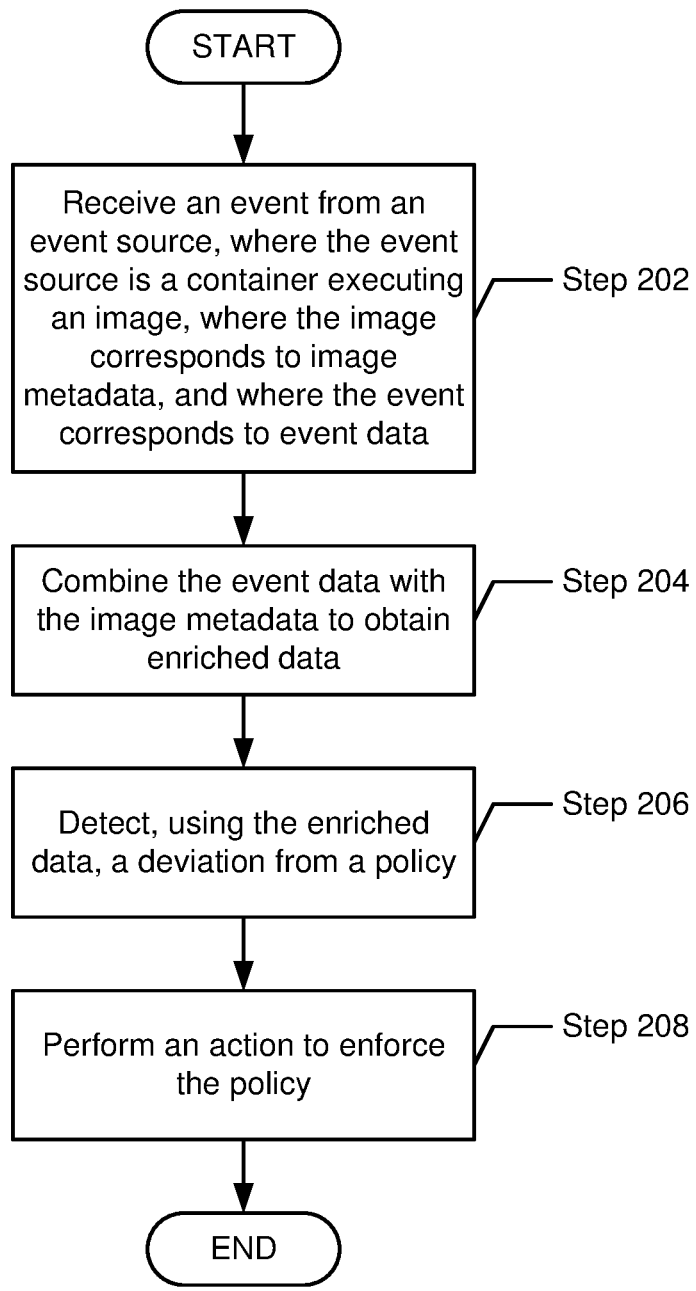
FIG. 2A, FIG. 2B, and FIG. 2C show flowcharts of a method in accordance with one or more embodiments of the invention.

FIG. 2A shows a flowchart in accordance with one or more embodiments of the invention. The flowchart depicts a process for enforcing a policy. One or more of the steps in FIG. 2A may be performed by the components (e.g., the policy enforcer (108) of the computer system (102)), discussed above in reference to FIG. 1A. In one or more embodiments of the invention, one or more of the steps shown in FIG. 2A may be omitted, repeated, and/or performed in parallel, or in a different order than the order shown in FIG. 2A. Accordingly, the scope of the invention should not be considered limited to the specific arrangement of steps shown in FIG. 2A.

Initially, in Step 202, an event is received from an event source. The event may be included in a stream of events. The policy enforcer may store the event in a repository. In one or more embodiments, the event may be indexed by one or more topics corresponding to the event (e.g., to facilitate quick lookup of events). The event may correspond to event data describing the event and/or the event source that generated the event. In one or more embodiments, the event source is a container executing an image. The image corresponds to image metadata including one or more attributes describing the image. In one or more embodiments, the event is received from an event source other than a container. For example, the event may be received from a cluster, a gateway, etc.

In Step 204, the event data is combined with the image metadata to obtain enriched data. In one or more embodiments, the enriched data may include one or more linkages between the event data and the image metadata. For example, the policy enforcer may identify a linkage between the event data and an owner of the image executed by the container.

In Step 206, a deviation from a policy is detected, using the enriched data. For example, the policy may be a security policy for an enterprise-wide computing platform or a load balancing policy for a cluster. The policy enforcer detects the deviation from the policy as described with respect to FIG. 2B, FIG. 2C, and the accompanying description below.

In Step 208, in response to detecting the deviation from the policy, an action is performed to enforce the policy. The action may correspond to an action type. The policy enforcer may perform an action with action type "soft" that sends a notification regarding the deviation from the policy to an owner of the image executed by the container that generated the event. For example, the policy enforcer may send the notification via an email message or via an alert in a dashboard. Continuing this example, the dashboard may monitor and report on the stream of events generated by one or more event sources. Alternatively, the policy enforcer may perform an action with action type "hard" that modifies the execution of the container that generated the event in response to detecting the deviation from the policy. For example, the policy enforcer may halt the execution of the container or initiate a diagnostic or security scan of the container.

Figure 2B:
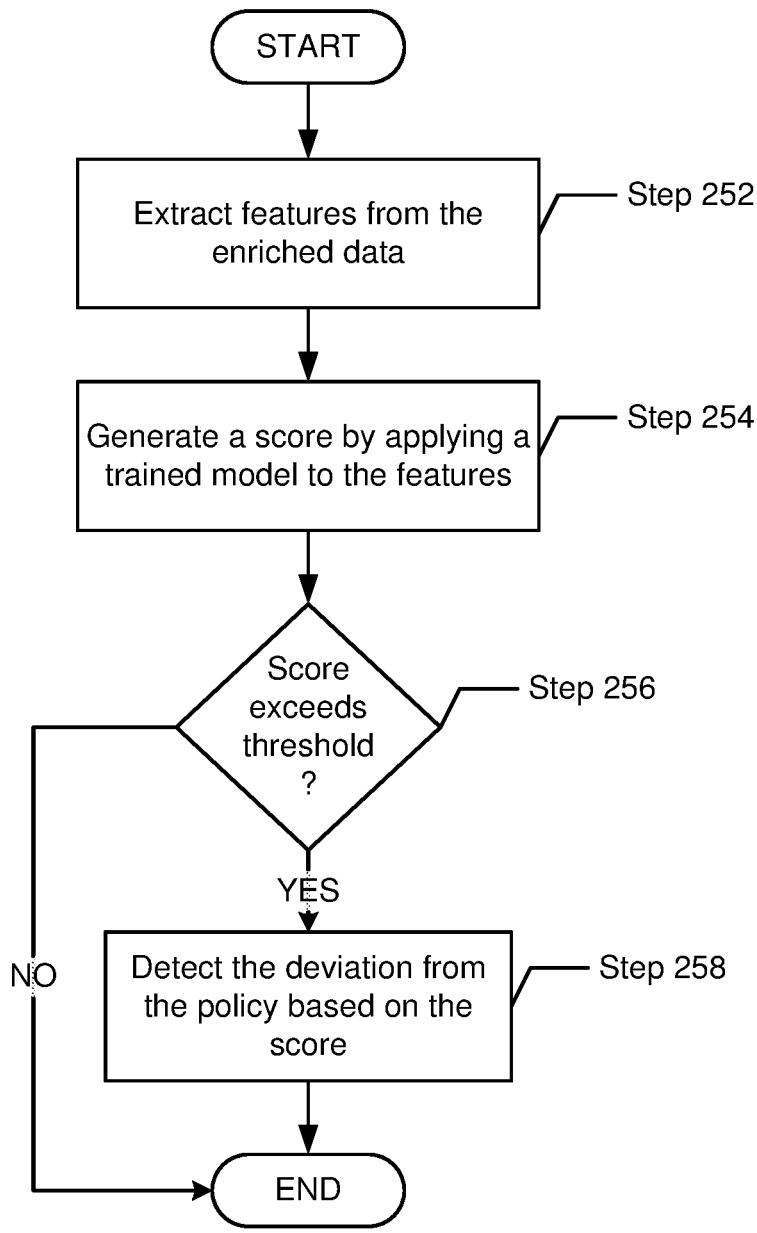

FIG. 2B shows a flowchart in accordance with one or more embodiments of the invention. The flowchart depicts a process for detecting a deviation from a policy. Moreover, the flowchart in FIG. 2B may correspond to Step 206 in FIG. 2A. One or more of the steps in FIG. 2B may be performed by the components (e.g., the policy enforcer (108) of the computer system (102)), discussed above in reference to FIG. 1A. In one or more embodiments of the invention, one or more of the steps shown in FIG. 2B may be omitted, repeated, and/or performed in parallel, or in a different order than the order shown in FIG. 2B. Accordingly, the scope of the invention should not be considered limited to the specific arrangement of steps shown in FIG. 2B.

Initially, in Step 252, features are extracted from the enriched data. The features may be based on aggregating event data from events. For example, a feature may be a count of error messages received by a gateway, or average CPU utilization in a cluster. Additionally or alternatively, the features may be based on image metadata of the image executed by a container that generated one or more events.

In Step 254, a score is generated by applying a trained model to the features. In one or more embodiments, the trained model generates the score by traversing a path through a decision tree. The path may include a series of branches that represent values of the features, and a leaf node representing a predicted outcome. The predicted outcome may be whether or not a deviation from a policy corresponding to the trained model will occur based on the feature values. The score may correspond to a probability that the deviation from the policy will occur.

If, in Step 256, it is determined that the score exceeds a threshold set by the policy, then in Step 258 the deviation from the policy is detected based on the score. For example, the policy enforcer may determine that the leaf node on the traversed path through the decision tree represents an outcome that predicts a policy deviation with a score (e.g., probability) greater than the threshold (e.g., a threshold of 0.5). In one or more embodiments, the policy enforcer proactively detects the deviation from the policy in response to the score exceeding the threshold. Thus, the policy enforcer may perform an action (e.g., an action performed in Step 208 above) when a policy deviation is predicted by the trained model. The proactively performed action may prevent damage that would be difficult to reverse after an actual deviation from the policy has occurred. In addition, a proactively performed action may prevent an actual deviation from the policy from occurring.

In one or more embodiments, the policy enforcer determines the action type of the action based on the score generated by the trained model. For example, when the score is within a specific range of scores, then the policy enforcer may perform an action with action type "soft", and when the score is outside the specific range of scores (e.g., the score exceeds the upper limit of the specific range), then then the policy enforcer may perform an action with action type "hard". Continuing this example, when the score is between 0.5 and 0.9, the policy enforcer may perform a soft action, and when the score exceeds 0.9, the policy enforcer may perform a hard action (see description of Step 208 above).

Figure 2C:
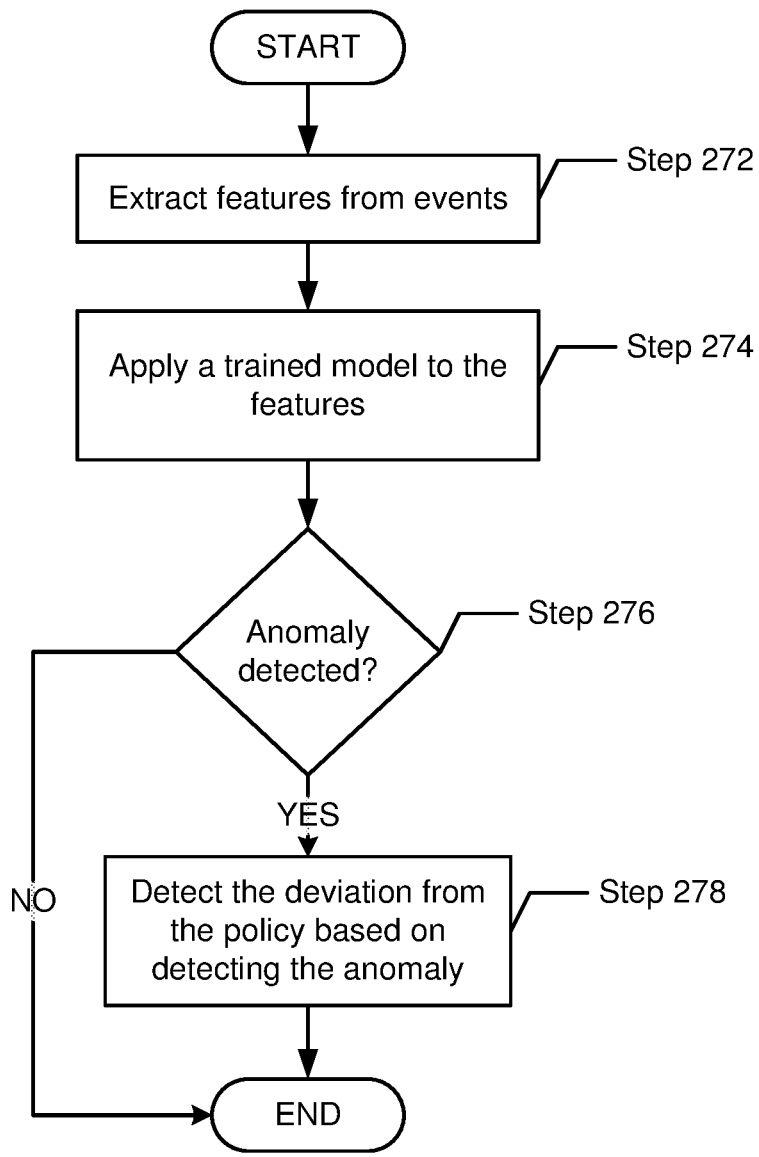

FIG. 2C shows a flowchart in accordance with one or more embodiments of the invention. The flowchart depicts a process for detecting a deviation from a policy. Moreover, the flowchart in FIG. 2C may correspond to Step 206 in FIG. 2A. One or more of the steps in FIG. 2C may be performed by the components (e.g., the policy enforcer (108) of the computer system (102)), discussed above in reference to FIG. 1A. In one or more embodiments of the invention, one or more of the steps shown in FIG. 2C may be omitted, repeated, and/or performed in parallel, or in a different order than the order shown in FIG. 2C. Accordingly, the scope of the invention should not be considered limited to the specific arrangement of steps shown in FIG. 2C.

Initially, in Step 272, features are extracted from events (see description of Step 252 above).

In Step 274, a trained model is applied to the features (see description of Step 254 above).

If, in Step 276, an anomaly is detected by applying the trained model to the features, then in Step 278 the deviation from the policy is detected based on the anomaly. For example, the trained model may detect a "spike" in the value of a feature, where the spike is correlated (e.g., based on training data) with a deviation from the policy. For example, a spike in the number of messages received within a time interval at a gateway may be correlated with a deviation from a security policy. Continuing this example, the spike in message traffic may result from a denial of service attack. As another example, a spike in CPU utilization at a subset of computing nodes a cluster may be correlated with a deviation from a load balancing policy.

Figure 3:
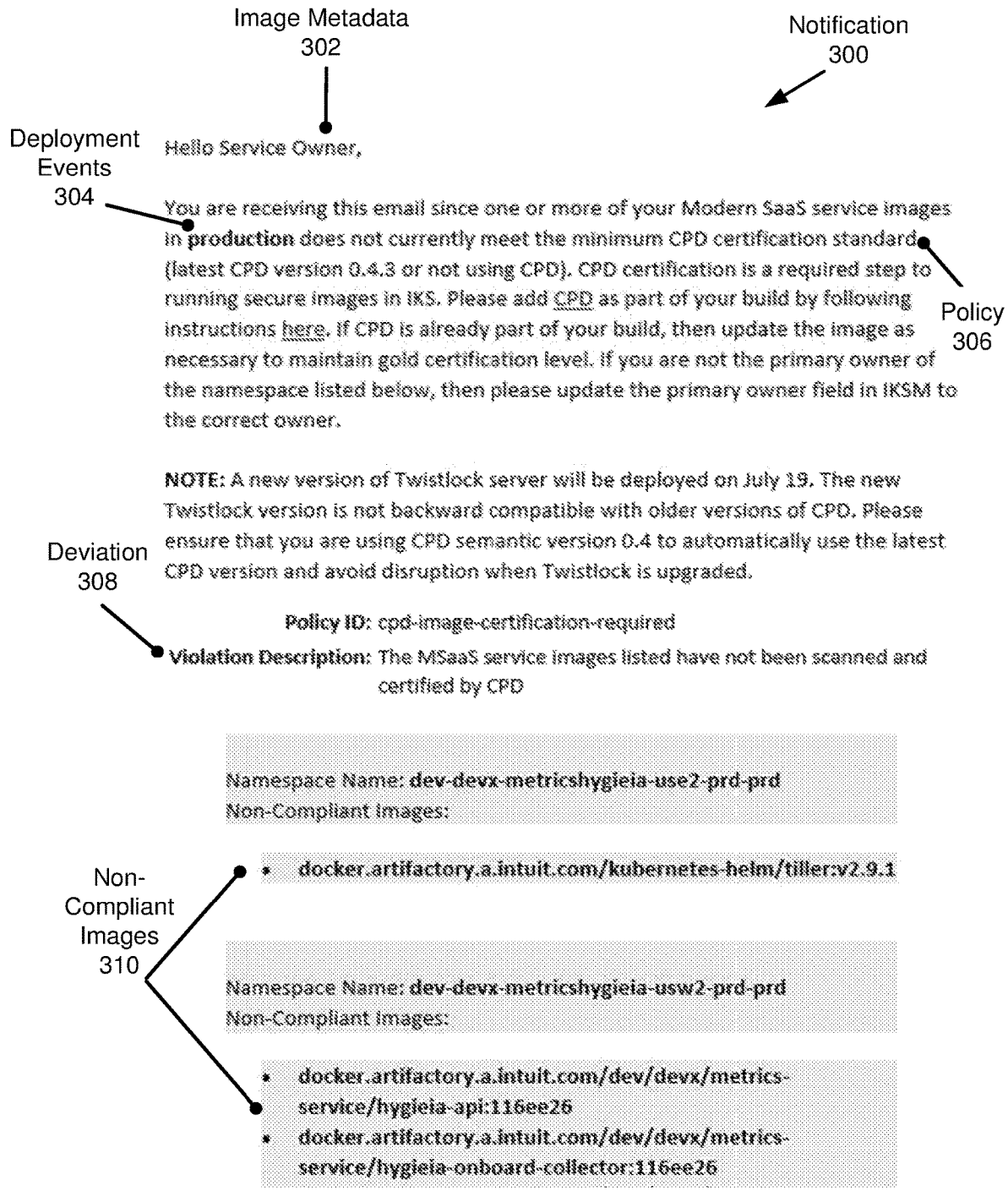
FIG. 3 and FIG. 4 show examples in accordance with one or more embodiments of the invention.
Figure 4:
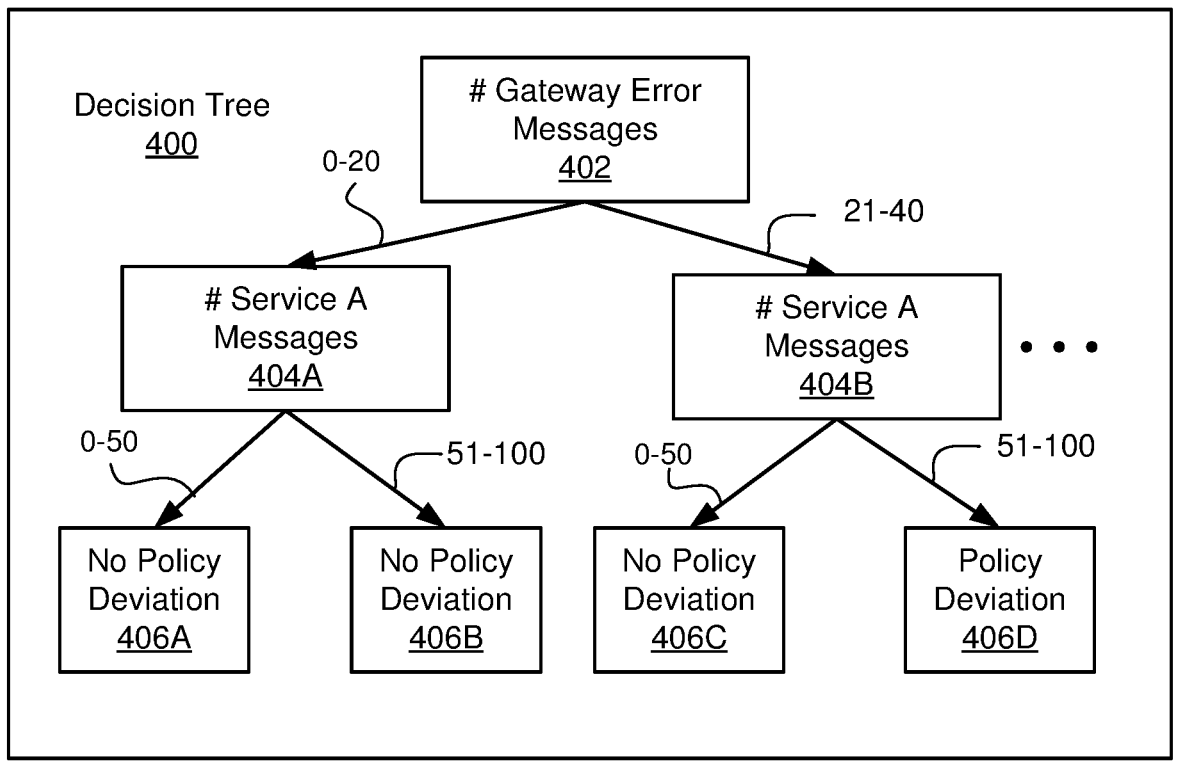

FIG. 3 and FIG. 4 show an implementation example(s) in accordance with one or more embodiments. The implementation example(s) are for explanatory purposes only and not intended to limit the scope of the invention. One skilled in the art will appreciate that implementation of embodiments of the invention may take various forms and still be within the scope of the invention.

FIG. 3 shows a notification (300) that describes a deviation (308) from a policy (306) ((132F, 132Y) in FIG. 1A) by deployment events (304) ((114B, 114K) in FIG. 1A). The deployment events (304) occurred when containers executing non-compliant images (310) ((122D, 122Z) in FIG. 1A and (155) in FIG. 1B) were deployed in a production environment. The policy (306) required that a specific type of certification be performed on the images. The policy enforcer used image metadata (302) corresponding to the non-compliant images (310) to identify the owner of the non-compliant images (310). The notification (300) represents a soft action in response to detecting the deviation (308) from the policy (306). Alternatively, the policy enforcer may have performed a hard action, such as automatically initiating a scanning and/or certification process on the non-compliant images (310).

FIG. 4 illustrates a decision tree (400) ((160) in FIG. 1C) which includes an internal root node corresponding to a "number of gateway error messages" feature (402) aggregated from gateway error message generation events. The decision tree (400) also includes internal nodes corresponding to a "number of service A messages" feature (404A, 404B) aggregated from service A message generation events. Each branch of the decision tree (400) corresponds to a value of the feature (402, 404A, 404B) corresponding to the internal node above the branch point. The decision tree (400) corresponds to a security policy. The decision tree (400) also includes leaf nodes corresponding to a "policy deviation" or "no policy deviation" outcome (406A, 406B, 406C, 406D). The decision tree (400) learns the correlation of feature values to the occurrence of policy deviations based on a training data set. For example, the feature values may be correlated to a security vulnerability related to a specific type of malware attack. As described below, the decision tree (400), once generated, may be used to predict whether or not a policy deviation will occur, where the prediction is based on traversing a path through the decision tree (400) using feature values extracted (e.g., aggregated) from events.

The path begins at the root node, which corresponds to the "number of gateway error messages" feature (402), and follows the right-hand branch because the "number of error messages received at gateway A" feature value is between 21 and 40. Then, the path again follows the right-hand branch at the internal node corresponding to the "number of service A messages" feature (404B), because the "number of messages generated by service B" feature value is between 51 and 100. The path then terminates on a leaf node corresponding to a "policy deviation" outcome (406D). The policy enforcer sends a notification to the owner of service A regarding the predicted "policy deviation" outcome (406D). The policy enforcer identifies the owner of service A using image metadata corresponding to the image executed by the container running service A. The notification includes a list of the features corresponding to the path, to provide additional information regarding the predicted "policy deviation" outcome (406D) that may be useful to the owner of service A. Alternatively, depending on whether the score associated with the "policy deviation" outcome (406D) exceeds a threshold score, the policy enforcer may instead perform a diagnostic or security scan of the container running service A.

Figure 5A:
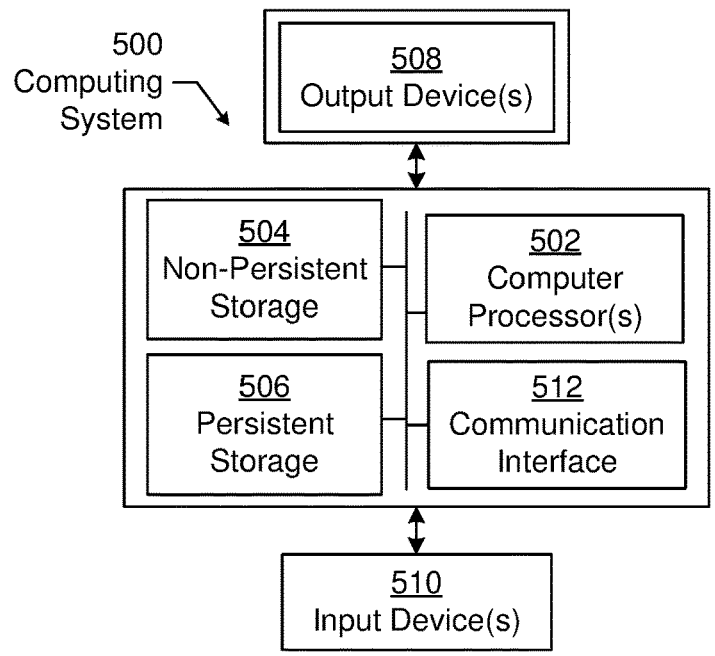
FIG. 5A and FIG. 5B show a flow diagram of computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
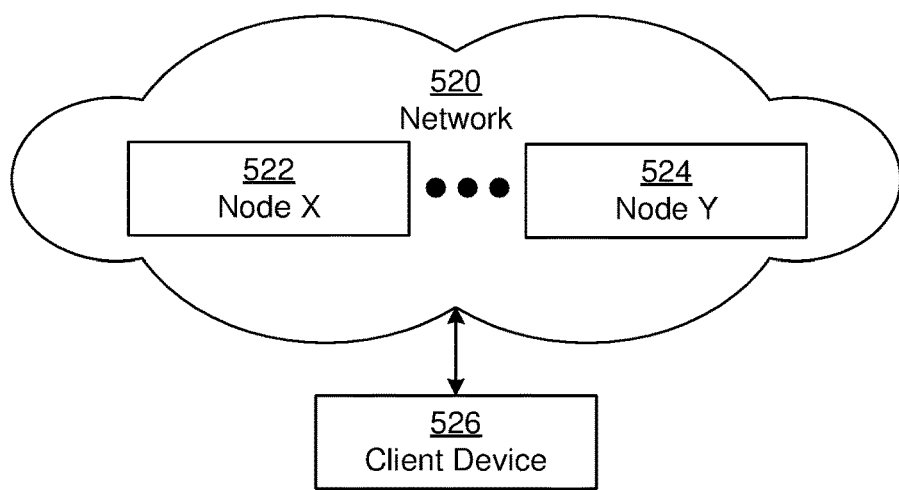

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (e.g., database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   receiving, from a first event source of a plurality of event sources, a first event of a plurality of events,
      wherein the first event corresponds to first event data, wherein the first event source is a container executing an image, and
wherein the image corresponds to image metadata comprising one or more attributes describing the image;
combining the first event data with the image metadata to obtain enriched data;
detecting, using the enriched data, a deviation from a policy; and
in response to detecting the deviation from the policy, performing an action to enforce the policy.

2. The method of claim 1, wherein detecting the deviation from the policy comprises:
extracting features from the enriched data;
generating a score by applying a trained model to the features; and
determining that the score exceeds a threshold set by the policy, wherein detecting the deviation from the policy is based on the score.

3. The method of claim 2, wherein the action corresponds to an action type, the method further comprising determining, using the score, the action type.

4. The method of claim 1, wherein detecting the deviation from the policy comprises:
extracting features from the plurality of events; and
detecting an anomaly by applying a trained model to the features.

5. The method of claim 1,
wherein the action corresponds to an action type,
wherein the one or more attributes comprise an owner, and
wherein performing the action comprises sending, to the owner, a notification regarding the deviation from the policy.

6. The method of claim 1,
wherein the action corresponds to an action type, and
wherein performing the action modifies the execution of the container.

7. The method of claim 6, wherein modifying the execution of the container comprises performing a diagnostic on the container.

8. The method of claim 1, further comprising:
receiving, from a second event source of the plurality of event sources, a second event of the plurality of events, the second event corresponding to second event data,
wherein the enriched data further comprises the second event data, and
wherein detecting the deviation from the policy is further based on the second event data.

9. A system, comprising:
a plurality of event sources comprising a first event source that is a container executing an image, wherein the image corresponds to image metadata comprising one or more attributes describing the image;
a repository storing a plurality of events comprising a first event corresponding to first event data; and
a policy enforcer configured to:
receive the first event from the first event source, and combine the first event data with the first image metadata to obtain enriched data;
detect, using the enriched data, a deviation from a policy, and
in response to detecting the deviation from the policy, perform an action to enforce the policy.

10. The system of claim 9, wherein the policy enforcer is further configured to detect the deviation from the policy by:
extracting features from the enriched data;
generating a score by applying a trained model to the features; and
determining that the score exceeds a threshold set by the policy, wherein detecting the deviation from the policy is based on the score.

11. The system of claim 10,
wherein the action corresponds to an action type, and
wherein the policy enforcer is further configured to determine, using the score, the action type.

12. The system of claim 9, wherein the policy enforcer is further configured to detect the deviation from the policy by:
extracting features from the plurality of events; and
detecting an anomaly by applying a trained model to the features.

13. The system of claim 9,
wherein the action corresponds to an action type,
wherein the one or more attributes comprise an owner, and
wherein performing the action comprises sending, to the owner, a notification regarding the deviation from the policy.

14. The system of claim 9, wherein the action corresponds to an action type, and
wherein performing the action modifies the execution of the container.

15. The system of claim 14, wherein modifying the execution of the container comprises performing a diagnostic on the container.

16. The system of claim 9, wherein the policy enforcer is further configured to:
receive, from a second event source of the plurality of event sources, a second event of the plurality of events, the second event corresponding to second event data,
wherein the enriched data further comprises the second event data, and
wherein detecting the deviation from the policy is further based on the second event data.

17. A method, comprising:
receiving, from a container of a plurality of containers executing an image of a plurality of images, an event of a plurality of events, wherein the image corresponds to image metadata comprising one or more attributes describing the image;
combining the event with the image metadata to obtain enriched data;
detecting, using the enriched data, a deviation from a security policy; and
in response to detecting the deviation from the security policy, performing an action to enforce the security policy.

18. The method of claim 17, wherein detecting the deviation from the security policy comprises:
extracting features from the enriched data;
generating a score by applying a trained model to the features; and
determining that the score exceeds a threshold set by the security policy, wherein detecting the deviation from the security policy is based on the score.

19. The method of claim 18, wherein the action halts execution of the container.

20. The method of claim 18, wherein the action performs a security scan of the container.

* * * * *